United States Patent
Metten et al.

(10) Patent No.: US 8,641,288 B2
(45) Date of Patent: Feb. 4, 2014

(54) ROLLING BEARING, IN PARTICULAR RADIAL NEEDLE BEARING HAVING A LABYRINTH SEAL

(75) Inventors: Norbert Metten, Aurachtal (DE); Tino Beck, Burgebrach (DE); Dieter Jauernig, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/500,113

(22) PCT Filed: Sep. 6, 2010

(86) PCT No.: PCT/EP2010/063006
§ 371 (c)(1),
(2), (4) Date: Apr. 4, 2012

(87) PCT Pub. No.: WO2011/042271
PCT Pub. Date: Apr. 14, 2011

(65) Prior Publication Data
US 2012/0195536 A1   Aug. 2, 2012

(30) Foreign Application Priority Data
Oct. 5, 2009 (DE) .......................... 10 2009 048 290

(51) Int. Cl.
*F16C 33/80* (2006.01)
*F16C 33/78* (2006.01)

(52) U.S. Cl.
USPC .......................................... 384/480; 384/486

(58) Field of Classification Search
USPC ......... 384/130, 477, 480, 484–486, 565, 572, 384/597, 618; 277/384, 345, 347, 420
See application file for complete search history.

(56) References Cited

U.S. PATENT DOCUMENTS

| | | | | | |
|---|---|---|---|---|---|
| 3,348,889 | A | * | 10/1967 | Schaeffler et al. | 384/484 |
| 3,447,848 | A | * | 6/1969 | Pitner | 384/484 |
| 3,479,100 | A | * | 11/1969 | Pitner | 384/484 |
| 3,659,662 | A | * | 5/1972 | Dicky | 277/420 |
| 4,440,401 | A | * | 4/1984 | Olschewski et al. | 277/384 |
| 4,614,446 | A | * | 9/1986 | Dreschmann et al. | 384/484 |
| 4,653,936 | A | * | 3/1987 | Olschewski et al. | 384/484 |
| 5,028,054 | A | * | 7/1991 | Peach | 277/348 |

(Continued)

FOREIGN PATENT DOCUMENTS

| | | |
|---|---|---|
| DE | 1 189 210 U | 3/1963 |
| DE | 1 944 576 U | 8/1966 |

(Continued)

*Primary Examiner* — Marcus Charles
(74) *Attorney, Agent, or Firm* — Lucas & Mercanti, LLP

(57) ABSTRACT

A radial needle rolling bearing, which has a thin-walled outer sleeve with radial rims that are axially inwardly directed on both sides, a plurality of needle bearings rolling on the inner lateral area of the sleeve and on the outer lateral area of the shaft to be supported, and a cage guiding the bearing needles in the circumferential direction in an evenly spaced manner. At least on one side, in addition to the needle cage, an additional stop disc is inserted into the needle sleeve. The disc is delimits axial movability of the needle cage together with a radial rim or a further stop disc inserted into the sleeve. Between the stop disc and the other radial rim, a sealing element is arranged, which seals the bearing. The sealing element is a labyrinth seal, which can be assembled from two individual mutually engaging sealing rings that have complimentary profile cross-sections.

7 Claims, 2 Drawing Sheets

(56) References Cited

U.S. PATENT DOCUMENTS

| | | | |
|---|---|---|---|
| 5,261,528 A * | 11/1993 | Bouchal | 384/480 |
| 5,383,549 A * | 1/1995 | Mayer | 384/480 |
| 5,676,472 A * | 10/1997 | Solomon et al. | 277/347 |
| 6,155,574 A | 12/2000 | Borgstrom et al. | |
| 6,206,182 B1 * | 3/2001 | Wilson et al. | 198/842 |
| 6,234,293 B1 * | 5/2001 | Fasoli | 193/37 |
| 6,547,668 B2 * | 4/2003 | Kopp | 277/615 |
| 6,641,512 B2 * | 11/2003 | Bryant et al. | 384/587 |
| 6,769,351 B2 * | 8/2004 | Lang et al. | 384/569 |
| 6,845,986 B2 * | 1/2005 | Hood et al. | 277/409 |
| 2004/0175065 A1 * | 9/2004 | Nguyen | 384/480 |
| 2006/0147141 A1 * | 7/2006 | Harwood et al. | 384/480 |
| 2008/0078648 A1 * | 4/2008 | Orlowski et al. | 384/144 |

FOREIGN PATENT DOCUMENTS

| | | | | |
|---|---|---|---|---|
| DE | 2421379 A * | 11/1975 | | F16C 33/76 |
| DE | 3516131 A * | 11/1986 | | F16C 33/66 |
| DE | 10 2008 005 029 A1 | 7/2009 | | |
| FR | 64 700 E | 12/1955 | | |
| GB | 2065829 A * | 7/1981 | | F16C 13/00 |
| JP | 55155914 A * | 12/1980 | | F16C 13/00 |
| JP | 60 113872 A | 6/1985 | | |
| JP | 7 279 952 A | 10/1995 | | |

* cited by examiner

ROLLING BEARING, IN PARTICULAR RADIAL NEEDLE BEARING HAVING A LABYRINTH SEAL

CROSS-REFERENCE TO RELATED APPLICATIONS

This application is a 371 of PCT/EP2010/063006 filed Sep. 9, 2010, which in turn claims the priority of DE 10 2009 048 290.3 filed Oct. 5, 2009. The priority of both applications is hereby claimed and both applications are incorporated by reference herein.

FIELD OF THE INVENTION

The invention relates to a rolling bearing and more specifically to radial needle bearings to provide support for the secondary mass on the primary mass of a dual mass flywheel in a motor vehicle.

BACKGROUND OF THE INVENTION

As is known, dual mass flywheels are arranged between the internal combustion engine and the transmission of a motor vehicle and are provided for the purpose of increasing driving comfort. A dual mass flywheel of this kind consists essentially of a disk-shaped primary mass connected directly to the crankshaft of the internal combustion engine and of a disk-shaped secondary mass, which is arranged coaxially with said primary mass and is connected via a clutch to the input shaft of the transmission. Both masses are coupled to one another by a plurality of damping means arranged therebetween and can be twisted relative to one another, counter to the action of said damping means, by way of a friction-reducing bearing assembly arranged on a bearing flange on the primary mass. During the operation of the motor vehicle, the primary mass is actively driven by means of the rotating crankshaft of the internal combustion engine, while the secondary mass, which, for its part, drives the transmission input shaft, is taken along by way of the damping elements, by means of which the irregularities resulting from the unbalance of the moving masses in the drive train and the irregularities in the rotation of the internal combustion engine resulting from the movements of the pistons are damped.

Among the means that have proven particularly suitable for bearing support between the secondary mass and the primary mass of the dual mass flywheel are not only sliding, cylindrical roller and ball bearings, but also radial needle bearings of the kind disclosed, for example, by JP 07-279 952 A or DE 1 944 576 U. Radial needle bearings of this kind consist essentially of a thin-walled outer needle sleeve, which has radial rims, that are axially inwardly directed on both sides, a multiplicity of bearing needles rolling on the inner circumferential surface of the needle sleeve and on the outer circumferential surface of the shaft to be supported, and a needle cage, which guides the bearing needles in the circumferential direction in an evenly spaced manner. At least on one side, adjacent to the needle cage, an additional thrust washer is inserted into the needle sleeve. The washer limits the axial mobility of the needle cage together with a radial rim or a further thrust washer inserted into the needle sleeve. To seal off the needle bearing, a sealing element is furthermore arranged between the at least one thrust washer and the other radial rim. The sealing element is a metal-reinforced or, alternatively, a simple lip sealing ring composed of an elastomer. The sealing lip of the sealing element makes sliding contact with the circumferential surface of the shaft to be supported.

However, the disadvantage with radial needle bearings of this kind has proven to be the sealing thereof by means of the sliding contact between the sealing lip of the lip seal thereof and the shaft since this sliding contact usually causes high friction, as a result of which there is increased wear on the lip seal and hence a reduction in the life of the needle bearing.

One possibility of avoiding such disadvantageous sliding contact between the seal and the shaft for the purpose of sealing off a radial needle bearing has furthermore been disclosed by DE 1 869 210 U. The radial needle bearing disclosed in this publication differs essentially from the needle bearing described above in that it is designed with angular-profile thrust washers on both sides adjacent to the needle cage and that the bearing needles roll on the circumferential surface of an additional inner ring instead of on the circumferential surface of a shaft. Both thrust washers are simultaneously components of two labyrinth seals that seal off the needle bearing on both sides and are furthermore formed by the radial rims of the needle sleeve and by two additional metal sealing rings, each secured on the inner ring of the needle bearing, between the thrust washers and the radial rims. The thrust washers and the radial rims of the needle bearing each have a gap with respect to the inner ring at the inside diameter and a gap with respect to the metal sealing rings at their inner annular surface. The metal sealing rings each have a gap with respect to the thrust washers at the outside diameter, with the result that the needle bearing is sealed off on both sides by noncontact labyrinth seals, which have a sealing gap with a number of bends.

However, the disadvantage with labyrinth seals designed in this way is that, in the case of needle bearings without an inner ring, as used in support bearings in dual mass flywheels, they cannot be integrated as a modular unit into the bearing, but can only be completed when the bearing is mounted on the shaft and, thus, give rise to relatively high assembly costs.

SUMMARY OF THE INVENTION

Starting from the disadvantages of the known prior art, it is therefore the underlying object of the invention to design a rolling bearing, in particular a radial needle bearing, which is designed, at least on one side, with an economical and easy-to-install seal which avoids sliding contact with the shaft to be supported.

According to the invention, this object is achieved in a rolling bearing, which has a thin-walled outer needle sleeve with radial rims which are axially inwardly directed at both ends of the needle sleeve. The rolling bearing also has a plurality of bearing needles rolling on an inner circumferential surface of the needle sleeve and on an outer circumferential surface of a shaft to be supported. Moreover, the rolling bearing has a needle cage, which guides the bearing needles in a circumferential direction in an evenly spaced manner. Additionally, the rolling bearing has a thrust washer, which is inserted into the needle sleeve so as to be adjacent to the needle cage and limit axial mobility of the needle cage together with one of the radial rims. Furthermore, the rolling bearing has a sealing element arranged between the thrust washer and the other of the radial rims for sealing off the radial needle bearing. Specifically, the object is achieved by virtue of the fact that the sealing element is designed as a labyrinth seal, which can have two individual mutually engaging sealing rings designed with complementary profile cross-sections.

In one embodiment, both sealing rings of the sealing element are composed of a heat-resistant plastic and each essentially have a C-shaped profile cross-section. Also, one sealing ring has with a smaller outside diameter than the other sealing ring. Where the rolling bearing is used as a support bearing in a dual mass flywheel, the use of a heat-resistant plastic for the sealing rings is required to prevent premature wear of the sealing rings because of the immediate proximity of the needle sleeve to the selector clutch and because of the heat radiation emanating therefrom. Moreover, the design of the sealing rings with different outside diameters is necessary in order to enable them to engage in one another to form a labyrinth seal.

In another embodiment, the sealing ring of larger diameter is secured by the outer circumferential surface of its outer profile leg on the inner circumferential surface of the needle sleeve by means of an interference fit, and rests by means of its profile web against the radial rim of the needle sleeve. By virtue of the interference fit with the inner circumferential surface of the needle sleeve, the sealing ring of larger diameter is thus designed as a fixed part of the labyrinth seal, while its contact with the radial rim of the needle sleeve ensures that the entire labyrinth seal is arranged in an axially immovable manner in the needle sleeve.

In a further embodiment, the sealing ring of smaller diameter has two encircling annular beads on the inner circumferential surface of its inner profile leg to enable it to be fixed on the circumferential surface of the shaft to be supported, and is arranged with its profile web parallel to the thrust washer. The fixing of the sealing ring of smaller diameter on the circumferential surface of the shaft to be supported thus has the effect that the sealing ring is designed as a co-rotating part of the labyrinth seal, while the arrangement of its profile web parallel to, but not in direct contact with the thrust washer is provided to form an additional sealing gap between the profile web and the thrust washer and to simultaneously provide a possibility of compensating slight axial movements of the shaft to be supported.

In yet another embodiment, the mutually engaging arrangement of the sealing rings of the labyrinth seal is implemented in such a way that, starting from the complementary C-shaped profile cross-sections thereof, the outer profile leg of the sealing ring of smaller diameter is arranged between the profile legs of the sealing ring of larger diameter, and the inner profile leg of the sealing ring of larger diameter is arranged between the profile legs of the sealing ring of smaller diameter. A sealing gap with a number of bends is thereby created between the individual profile legs of both sealing rings, making it possible to achieve a highly effective seal.

In an even further embodiment, on individual annular surfaces of the profile legs facing the sealing ring of larger diameter, the sealing ring of smaller diameter has a plurality of spacing bosses distributed uniformly around the circumference for the formation of a uniform sealing gap between the sealing rings. These spacing bosses are designed as point-type elevations in the form of oval heads on the sealing ring of smaller diameter and ensure that, when axial forces act on the rolling bearing, the sealing rings do not move into one another to such an extent that the sealing gap is closed but that, even then, there is always a sealing gap corresponding to the height of the spacing bosses. It has proven particularly advantageous here if, on the outer annular surface of its profile web, an encircling row of spacing bosses is arranged on the outer annular surface of the outer profile leg of the sealing ring of smaller diameter said such that the row is in operative connection with the inner annular surface of the outer profile leg of the sealing ring of larger diameter, and if a further row of spacing bosses is arranged on the annular end face of the inner profile leg of the sealing ring of smaller diameter such that the row is in operative connection with the inner annular end face of a radially inward-directed extension of the profile web of the sealing ring of larger diameter. As an alternative, it is of course also possible to arrange the spacing bosses on individual annular surfaces of the profile legs of the sealing ring of larger diameter instead of on the surfaces facing the sealing ring of smaller diameter.

In a final embodiment of the rolling bearing, on the outer annular surface of its profile web, the sealing ring of smaller diameter is additionally designed with further spacing bosses distributed uniformly around the circumference for the formation of a further sealing gap between it and the thrust washer. These spacing bosses, which are likewise designed as point-type elevations in the form of oval heads on the profile web of the sealing ring of smaller diameter, are provided for the purpose of ensuring that, when axial forces act on the rolling bearing, the sealing ring of smaller diameter does not move toward the thrust washer to such an extent that the additional sealing gap between the latter and the sealing ring is closed, and therefore, here too, a sealing gap corresponding to the height of the spacing bosses remains in all cases.

The rolling bearing designed in accordance with the invention thus has the advantage over the rolling bearings known from the prior art that it is designed with a labyrinth seal which can be produced economically, which, on the one hand, avoids sliding contact with the shaft to be supported and, on the other hand, can be integrated into the rolling bearing as a fully assembled modular unit and is easy to handle during assembly of the bearing. Moreover, a labyrinth seal of this kind additionally offers the possibility of use within a U-profile-shaped sheet metal ring as a preassembled single sealing system in other appropriate applications.

BRIEF DESCRIPTION OF THE DRAWINGS

A preferred embodiment of the rolling bearing designed in accordance with the invention is explained in greater detail below with reference to the attached drawings, in which.

DETAILED DESCRIPTION OF THE INVENTION

Figure 1:
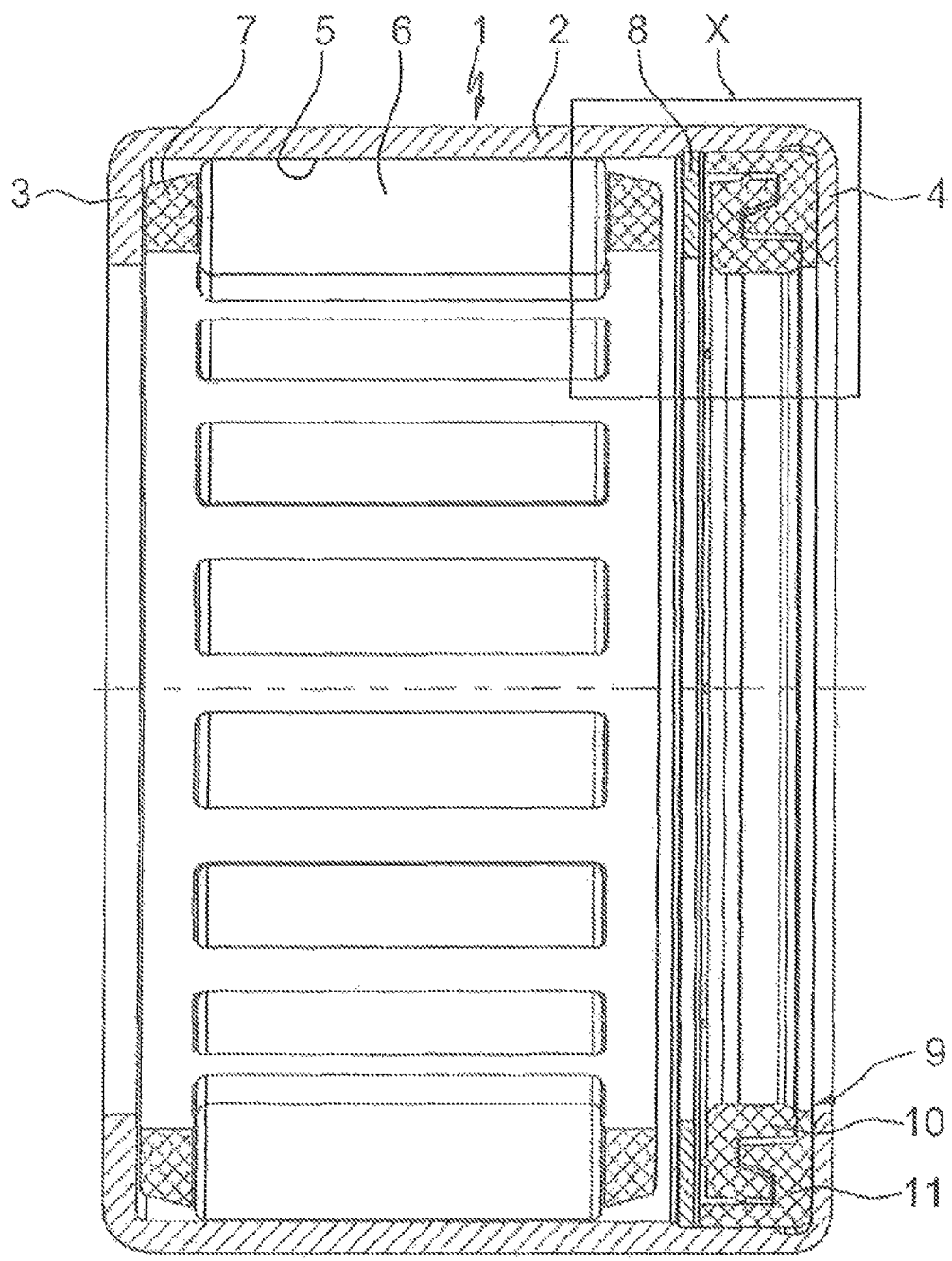
FIG. 1 shows an enlarged view of a cross section through a rolling bearing designed in accordance with the invention.

FIG. 1 clearly shows a radial needle bearing 1, which is suitable for supporting the secondary mass on the primary mass of a dual mass flywheel in a motor vehicle and which consists essentially of a thin-walled outer needle sleeve 2 having radial rims 3, 4 that are axially inwardly directed on both sides, a multiplicity of bearing needles 6 rolling on the inner circumferential surface 5 of the needle sleeve 2 and on the outer circumferential surface of a shaft (not shown), and a needle cage 7, which guides the bearing needles 6 in the circumferential direction in an evenly spaced manner. FIG. 1 also shows that, on one side, adjacent to the needle cage 7, an additional thrust washer 8 is inserted into the needle sleeve 2, which washer is provided to limit the axial mobility of the needle cage 7 together with one radial rim 3 of the needle sleeve 2, and that a sealing element 9, which is provided for sealing off the radial needle bearing 1 on one side, is arranged between the thrust washer 8 and the other radial rim 4.

From FIG. 1, it can furthermore be seen that the sealing element 9 is designed as a labyrinth seal, which, according to the invention, can be assembled from two individual mutually engaging sealing rings 10, 11 having complementary profile cross sections. In addition, it is clear from the enlarged representation in FIG. 2 that the sealing rings 10, 11 of said sealing element 9, which are composed of a heat-resistant plastic, each essentially have a C-shaped profile cross section, and one sealing ring 10 is designed with a smaller outside diameter than the other sealing ring 11. In this arrangement, the sealing ring 11 of larger diameter is arranged in the needle sleeve 2 in such a way that it can be secured by the outer circumferential surface 12 of its outer profile leg 13 on the inner circumferential surface 5 of the needle sleeve 2 by means of an interference fit, and rests by means of its profile web 14 against the radial rim 4 of the needle sleeve 2. The sealing ring 10 of smaller diameter, by contrast, is arranged with its profile web 20 parallel to the thrust washer 8 and, on the inner circumferential surface 16 of its inner profile leg 17, has two encircling annular beads 18, 19, by means of which it can be fixed on the circumferential surface of the shaft (not shown).

Figure 2:
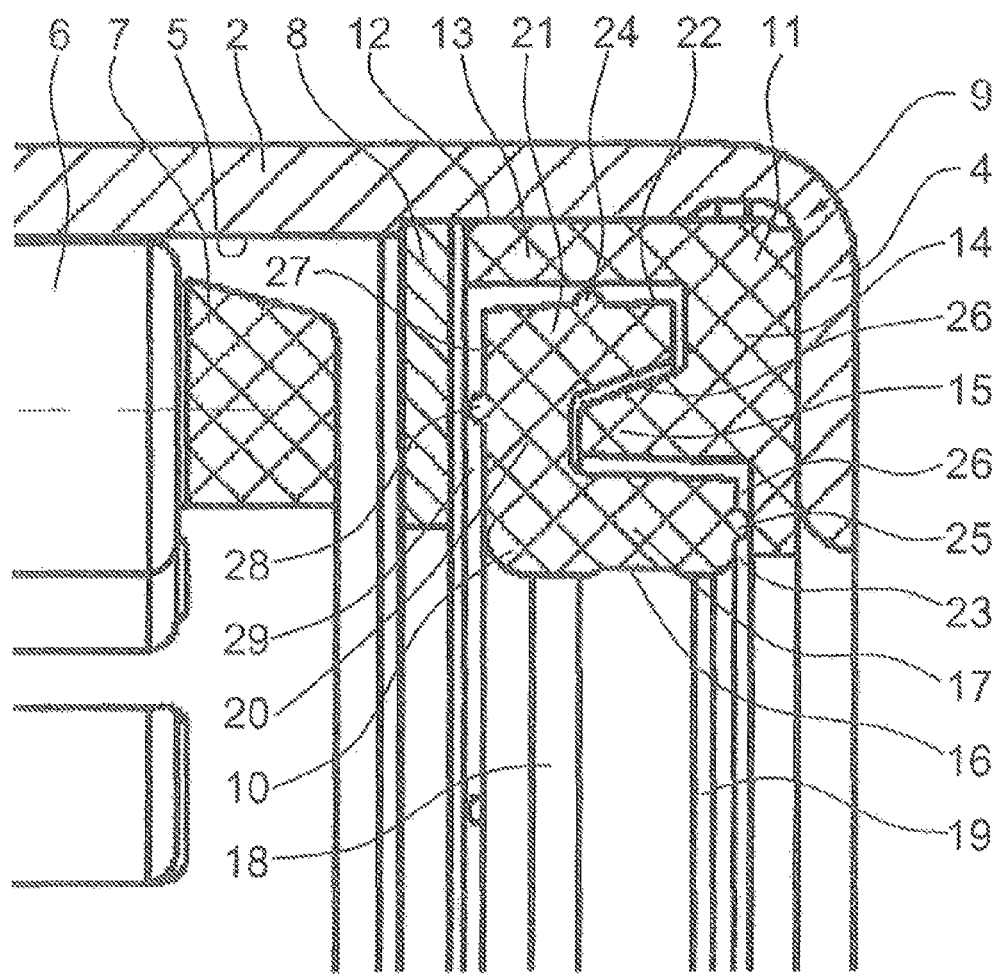
FIG. 2 shows an enlarged view of the detail X of the rolling bearing designed in accordance with the invention as shown in FIG. 1.

As is likewise apparent from FIG. 2, the mutually engaging arrangement of the sealing rings 10, 11 of the sealing element 9 is then implemented in such a way that, starting from the C-shaped profile cross sections thereof, the outer profile leg 21 of the sealing ring 10 of smaller diameter is arranged between the profile legs 13, 15 of the sealing ring 11 of larger diameter, and the inner profile leg 15 of the sealing ring 11 of larger diameter is arranged between the profile legs 17, 21 of the sealing ring 10 of smaller diameter.

In order to ensure a minimum height at all times for the sealing gap 26 formed in this arrangement between the sealing rings 10, 11, it is furthermore the case that, on individual annular surfaces 22, 23 of its profile legs 17, 21, said surfaces facing the sealing ring 11 of larger diameter, the sealing ring 10 of smaller diameter has a plurality of spacing bosses 24, 25, which are clearly designed as point-type elevations in the form of oval heads distributed uniformly around the circumference. A first encircling row of spacing bosses 24 is arranged on the outer annular surface 22 of the outer profile leg 21 of the sealing ring 10 of smaller diameter and is in operative connection with the inner annular surface (not designated specifically) of the outer profile leg 13 of the sealing ring 11 of larger diameter, while a second row of spacing bosses 25 is arranged on the annular surface 23 of the inner profile leg 17 of the sealing ring 10 of smaller diameter and is in operative connection with the inner annular end face (likewise not designated specifically) of a radially inward-directed extension of the profile web 14 of the sealing ring 11 of larger diameter. Moreover, a third row of spacing bosses 28 distributed uniformly around the circumference is arranged on the outer annular surface 27 of the profile web 20 of the sealing ring 10 of smaller diameter, thereby forming a further sealing gap 29 between it and the thrust washer 8. A sealing gap 26, 29 with a number of bends is thereby created between the individual profile legs 17, 21 and 13, 15 of both sealing rings 10, 11 and between the sealing ring 10 and the thrust washer 8, making it possible to achieve a highly effective seal.

LIST OF REFERENCE SIGNS

1 Radial Needle Bearing
2 Needle Sleeve
3 Radial Rim on 2
4 Radial Rim on 2
5 Inner Circumferential Surface on 2
6 bearing Needles
7 Needle Cage
8 Thrust Washer
9 Sealing Element
10 Sealing Ring of Smaller Diameter
11 Sealing Ring of Larger Diameter
12 Outer Circumferential Surface of 13
13 Outer Profile Leg of 11
14 Profile Web of 11
15 Inner Profile Leg of 11
16 Inner Circumferential Surface of 17
17 Inner Profile Leg of 10
18 Annular Bead on 16
19 Annular Bead on 16
20 Profile Web of 10
21 Outer Profile Leg of 10
22 Annular Surface on 21
23 Annular Surface on 17
24 Spacing Bosses on 22
25 Spacing Bosses on 23
26 Sealing Gap between 10 and 11
27 Annular Surface on 20
28 Spacing Bosses on 27
29 Sealing Gap between 10 and 8

The invention claimed is:

1. A radial needle bearing, comprising:
a thin-walled outer needle sleeve having radial rims that are axially inwardly directed at both ends of the needle sleeve;
a plurality of bearing needles rolling on an inner circumferential surface of the needle sleeve and on an outer circumferential surface of a shaft to be supported;
a needle cage, which guides the bearing needles in a circumferential direction in an evenly spaced manner;
a thrust washer inserted into the needle sleeve so as to be adjacent to the needle cage and limit axial mobility of the needle cage together with one of the radial rims; and
a sealing element arranged at least between the thrust washer and another of the radial rims for sealing off the radial needle bearing,
wherein the sealing element is a labyrinth seal having two individual mutually engaging sealing rings that have complementary profile cross-sections, and
wherein a first sealing ring of the two sealing rings has a plurality of spacing bosses distributed on individual annular surfaces of the first sealing ring that face a second sealing ring of the two sealing rings, to form a uniform sealing gap between the two sealing rings.

2. The radial needle bearing as claimed in claim 1, wherein both of the sealing rings of the sealing element are composed of a heat-resistant plastic and both of the sealing rings have a substantially C-shaped cross-sectional profile, and wherein the first sealing ring has a smaller outside diameter than the second sealing ring.

3. The radial needle bearing as claimed in claim 2, wherein the second sealing ring of a larger outside diameter has an outer profile leg and a profile web, and wherein the second sealing ring is secured by an outer circumferential surface of the outer profile leg on the inner circumferential surface of the needle sleeve by an interference fit and the profile web rests against the another of the radial rims of the needle sleeve.

4. The radial needle bearing as claimed in claim 3, wherein the first sealing ring has an inner profile leg, a profile web arranged parallel to the thrust washer and two encircling annular beads formed on an inner circumferential surface of the inner profile leg to enable the inner profile leg to be fixed on the outer circumferential surface of the shaft.

5. The radial needle bearing as claimed in claim 4, wherein the first sealing ring further comprises an outer profile leg and the second sealing ring further comprises an inner profile leg, the first sealing ring is arranged between the inner profile leg and the outer profile leg of the second sealing ring, and the inner profile leg of the second sealing ring is arranged between the inner profile leg and the outer profile leg of the first sealing ring.

6. The radial needle bearing as claimed in claim 5, wherein the plurality of spacing bosses are distributed on individual annular surfaces of the inner profile leg and the outer profile leg of the first sealing ring that face the second sealing ring uniformly around a circumference of the first sealing ring, to form the uniform sealing gap between the sealing rings.

7. The radial needle bearing as claimed in claim 6, wherein the first sealing ring has further spacing bosses distributed uniformly around the circumference on an outer annular surface of the profile web of the first sealing ring to form a further sealing gap between the first sealing ring and the thrust washer.

\* \* \* \* \*